Patented Sept. 7, 1948

2,448,823

UNITED STATES PATENT OFFICE 2,448,823

TRIBIPHENYLMETHANE DYESTUFF AND PIGMENT DYESTUFFS AND PROCESS FOR MAKING THE SAME

Alexander H. Popkin, Bronx, N. Y., assignor to Sun Chemical Corporation, a corporation of Delaware No Drawing. Application March 11, 1944, Serial No. 526,131

9 Claims. (Cl. 260—387)

1

This invention relates to coloring materials from reacted products of biphenyl, and more particularly to tribiphenylmethane dyestuffs and pigment dyestuffs, and to methods for producing such materials.

It is an object of the invention to provide products dyestuffs and pigment dyestuffs hitherto unknown, by treatment of biphenyl and certain of the reacted products thereof.

Another object of the invention is to prepare hitherto unknown triarylmethane dyestuffs by effecting oxidation of certain substituted derivatives prepared by nitration and reduction of biphenyl.

Another object of the invention is to furnish such products which may generally be represented by the formula:

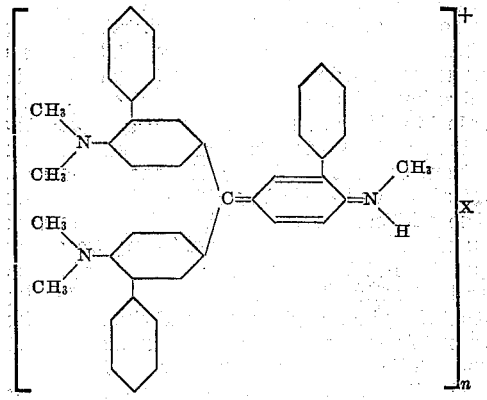

in which X represents a monovalent, divalent, or trivalent anion, and $n$ is 1, 2, or 3.

Another object of the invention is to furnish such products which may generally be represented by the formula:

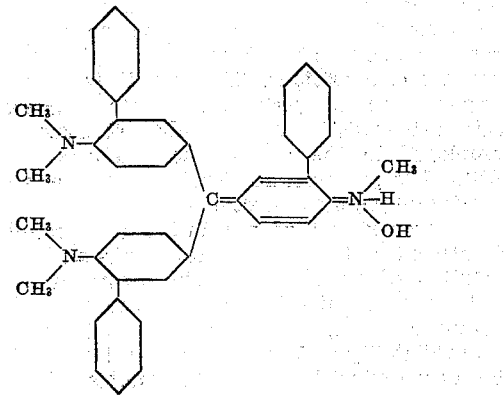

Another object of the invention is to prepare hitherto unknown triarylmethane pigment dyestuffs by effecting reaction between an oxidation product of substituted derivatives of biphenyl and an acid such as phosphotungstic acid, phosphomolybdic acid, phosphotungstomolybdic acid and tannic acid.

Other objects of the invention will be apparent from the following description and appended claims.

I have found according to the present invention that when biphenyl, or certain of the reacted products thereof, is treated under reaction conditions as hereinafter described that a series of hitherto unknown coloring agents are secured. Such coloring agents, comprising both dyestuffs and pigment dyestuffs, have a distinctive violet-blue shade.

Several illustrative examples are hereinafter given of the products of the invention and of processes for securing such products, representative of successful practical operations.

*Example 1.*—In a reaction vessel are placed 4 moles of biphenyl, 356 cc. of sulfuric acid (sp. gr. 1.84), 316 cc. of nitric acid (sp. gr. 1.42) and 228 cc. of water. Subsequently there is incorporated therein a mixture of 248 cc. of sulfuric acid (sp. gr. 1.84) and 512 cc. of nitric acid (sp. gr. 1.42), under conditions such that predominantly 2-nitrobiphenyl and 4-nitrobiphenyl are formed, and satisfactory results are secured with the materials above described by keeping the mixture under inter-reactive agitation, as by stirring, throughout the addition period, by adding the mixture of nitric and sulfuric acids slowly over a period of approximately two hours, by maintaining agitation for a period of approximately four hours after addition of the acids is completed to insure completion of the mononitration reaction, and by keeping the contents of the reaction vessel at a temperature of about 35–40° C. as by heating throughout the addition and subsequent reaction period.

At the end of the reaction period described above, the acid mixture is withdrawn as by decantation, and the remaining material washed several times with water and dilute sodium carbonate solution to remove the acid remaining. The washed product then is dried as by heating to approximately 100° C. In this way a mixture of 2-nitrobiphenyl and 4-nitrobiphenyl is secured.

To separate 2-nitrobiphenyl, the mixed product is heated until completely melted, and then permitted to crystallize without stirring. The crystals thus secured are removed, as by centrifuging, and the oil from which the crystals have been separated distilled to separate 2-nitrobiphenyl, which is recovered from the distillate.

Example 2.—A solution of 100 grams of 2-nitrobiphenyl (satisfactorily prepared as described in Example 1) in 50 cc. of benzene is added to a reaction vessel which contains 200 grams of iron borings and 35 cc. of concentrated hydrochloric acid. The mixture then is heated, suitably under reflux conditions, to the boiling point of benzene, and 1 cc. of water added. When the refluxed benzene becomes clear, an additional 1 cc. of water is added. This is repeated until 26 cc. of water has been added. During the period of addition of water, which, with the quantities above described takes about four hours, the contents of the reaction vessel are maintained under reflux, as by heating, and under effective reduction admixture conditions as by agitation.

The reaction mixture subsequently is treated as by centrifuging to remove the iron borings. The benzene solution then is separated from the water layer, suitably by decantation, and admixed with 200 cc. of 3N. hydrochloric acid to effect formation of a precipitate of 2-aminobiphenyl hydrochloride. The latter is separated as by filtration, and treated with a base, such as caustic soda, to effect formation of 2-aminobiphenyl.

Example 3.—A mixture of 67 gms. o-aminobiphenyl (satisfactorily prepared as described in Example 2) 74 gms. methanol and 7 gms. sulfuric acid (66° Bé.) is placed in an autoclave and heated under reactive methylating conditions, and with the quantities above described, satisfactory conditions are secured when the materials are heated for approximately 4 hours at temperatures in the range 200–210° C., and under pressures of about 400–500 lbs. per square inch. At the end of the reaction period, the reaction mixture is made alkaline as with an aqueous solution of sodium carbonate. The alkaline mixture then is extracted with benzene and the benzene extract allowed to evaporate to facilitate removal of benzene. When benzene has been evaporated, the residue is satisfactorily distilled under reduced pressure, and the portion distilling at 144 to 146.5° C. at 10 mm. pressure of mercury collected as the desired product. This fraction is essentially o-phenyl-N,N-dimethylaniline, with a relatively minor proportion of o-phenyl-N-methylaniline.

To effect oxidation of said product, a mixture is prepared, consisting of:

| | Grams |
|---|---|
| Sodium chloride | 175 |
| Copper sulfate | 10 |
| Phenol | 8 |
| Water | 2 |
| o-Phenyl-N,N-dimethylaniline | 32.6 |
| | 227.6 |

This mixture is placed in a reaction vessel and heated at 54–55° C. for a period of 16 hours. At the conclusion of this period, the product obtained is added to an aqueous solution of calcium oxide. The aqueous solution of calcium oxide is heated to its boiling point throughout the addition period. In this manner the oxidation product of o-phenyl-N,N-dimethylaniline is separated from other materials present in the oxidation reaction product, and appears as a separate layer, which is removed from the other materials present as by decantation. A yield of approximately 90% of a salt of the oxidation product of o-phenyl-N,N-dimethylaniline theoretically obtainable from the above series of reactions thus is secured.

The salt of the oxidation product of o-phenyl-N,N-dimethylaniline prepared as described is treated to effect formation of a free dye base, satisfactorily with an aqueous solution of sodium hydroxide.

The free dye base is such that when treated with an aqueous solution of an acid such as hydrochloric, a solution of triarylmethane dyestuff of violet-blue color is secured, applicable for coloring of cotton, wool and silk.

Also, the free dye base prepared as described alternately may be dissolved in oleic acid to give a solution of dye. Such violet-blue solutions are effective as a toning or coloring agent in compositions such as paints and printing inks, and coating compositions, for example.

For utilization as a coloring agent in a coating composition, for example, a pigment dyestuff which is insoluble in the vehicle can be prepared according to the present invention. And in practice, successful commercial operations have been secured by preparing materials such as a tungstated, tungstomolybdated, molydated or tannated pigment dyestuff from the dyestuffs above described. As an illustrative example of the preparation of one such material, 3.3 parts of sodium tungstate, 21.78 parts of sodium molybdate, 2.98 parts of sodium monohydrogen phosphate and 9.6 parts of concentrated sulfuric acid are dissolved in 500 parts of water, the acidity of the solution then being adjusted to pH 3. The temperature of the solution is maintained at approximately room temperature and 100 parts of an aqueous solution containing 10 parts of the free dye base above described and 5 parts of hydrochloric acid added under conditions such that effective reaction admixture is secured, and such conditions are obtained with the above quantities by agitation, as by stirring of the admixture during the addition period. When the aqueous solution of free dye base has been incorporated, the temperature of the mixture is raised to about 60° C., as by heating to complete the color development of the pigment dyestuff, and the latter then separated from the remaining materials, as by filtration. The separated pigment dyestuff is washed with water to remove water-soluble materials, and then dried as by warming to remove water. A pigment dyestuff is obtained which has a clean, strong, blue color.

The new dyestuffs and pigment dyestuffs prepared by practicing this invention are of distinctive color characteristics as described. They can be employed as direct coloring agents for cotton, wool, silk, as toning agents and pigments for coating compositions. Further, it is seen that applicant's new dyestuffs and pigment dyestuffs retain their distinctive color characteristics when employed in the forms described and can be utilized in practical application where such dyestuffs and pigment dyestuffs are applicable.

In preparation of a solution of dyestuff by treatment of the free dye base with an aqueous solution of an acid as above described hydrochloric acid, which is an aqueous solution of hydrogen chloride, generally is employed because of its availability and cost. Successful results have been secured with other water-soluble acids such as sulfuric, phosphoric and acetic in the preparation of dyestuff solutions according to the present invention, these acids furnishing monovalent, divalent or trivalent anions in aqueous solution.

While one method of preparing a pigment dyestuff by interaction of the oxidation product of o-phenyl-N,N-dimethylaniline has been described, other acids forming pigment dyestuffs, as tannic acid, may be employed. The acids, typified by phosphotungstic acid, phosphomolybdic acid, phosphotungstomolybdic acid, and tannic acid comprise a group of acids which may be employed in preparing pigment dyestuffs from solutions of soluble dyestuffs.

Because of the complexity of the physical and chemical structure of such pigment dyestuffs, it is not possible to state with certainty the formulas of these materials. However, it is known that the dye base combines with the particular acid or acids chosen so as to form an insoluble coloring material which may be a simple compound or a mixture of compounds, and which has the color properties described. One possible way in which the structure of these materials may be represented is by the general formula:

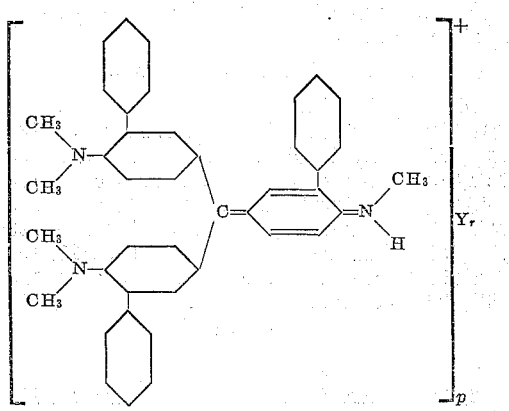

where Y represents an anion of the phosphotungstic acid, phosphomolybdic acid, phosphotungstomolybdic acid, or tannic acid group and $p$ and $r$ are small integers.

But whatever the structure of such materials, it is certain that when the dye bases of the present invention are reacted under effective reaction admixture conditions as described, that a variety of insoluble pigment dyestuffs of distinctive color and utility are secured.

The term dyestuff as used in describing applicant's invention is intended to designate a coloring agent which is soluble in the vehicle in which it is employed. The term pigment dyestuffs is intended to mean an insoluble salt of a dyestuff. By the term toning agent is meant a coloring agent which generally is utilized to impart a desired shade of color to a pigmented composition. Thus, for example, in printing ink containing gas black pigments such as carbon black or mixtures of gas black pigments with other black pigments, a relatively small proportion of a coloring agent often is employed to impart a desired shade to the black printing ink.

While the products herein described and the methods of producing the same constitute preferred embodiments of the invention, it is to be understood that the invention is not limited to these precise products and methods, and that changes may be made therein without departing from the scope of the invention which is defined in the appended claims.

What is claimed is:
1. A water-soluble tribiphenylmethane dyestuff represented by the formula:

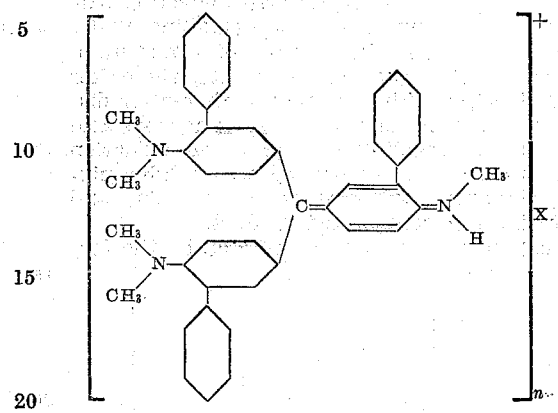

in which X represents an anion and $n$ is 1, 2, or 3.

2. A fatty acid-soluble tribiphenylmethane dyestuff represented by the formula:

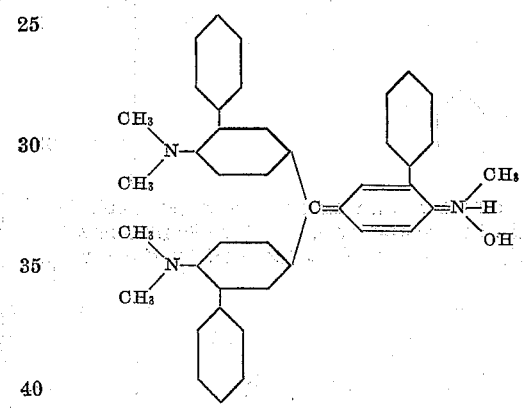

3. A coloring agent represented by the formula:

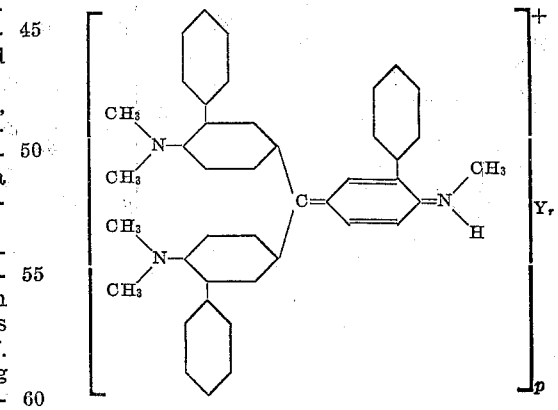

where Y represents an anion and $p$ and $r$ are small whole numbers.

4. The process of preparing a triarylmethane free dye base which comprises effecting oxidation of o-phenyl-N,N-dimethylaniline under acidic conditions in the presence of a mixture of sodium chloride and copper sulfate, and thereafter separating and recovering the oxidation product.

5. The process of preparing a triarylmethane dyestuff which comprises effecting oxidation of o-phenyl-N,N-dimethylaniline under acidic conditions in the presence of a mixture of sodium chloride and copper sulfate, thereafter separating the oxidation product, and thereafter dissolving said oxidation product in an aqueous acid medium.

6. The process of preparing a triarylmethane pigment dyestuff which comprises effecting oxidation of o-phenyl-N,N-dimethylaniline under acidic conditions in the presence of a mixture of sodium chloride and copper sulfate, thereafter separating the oxidation product, thereafter dissolving said oxidation product in an aqueous acid medium and reacting said dissolved oxidation product with an acid forming an insoluble pigment therewith, and thereafter separating and recovering the precipitated product.

7. A pigment dyestuff represented by the formula:

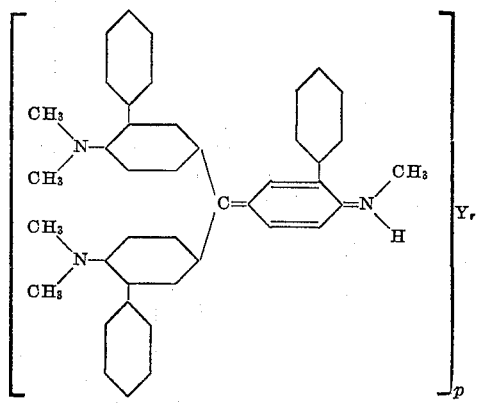

where Y represents an anion of a water soluble acid, and where $p$ and $r$ are small whole numbers.

8. A pigment dyestuff represented by the formula:

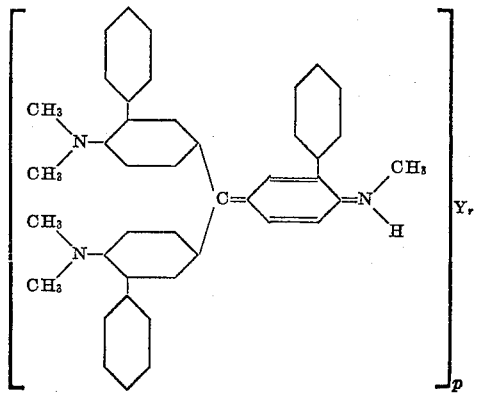

where Y represents an anion of a water-soluble phosphotungstomolybdic acid, and where $p$ and $r$ are small whole numbers.

9. A water-soluble tribiphenylmethane dyestuff represented by the formula:

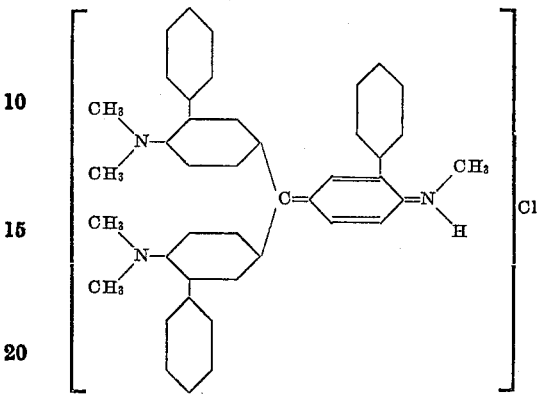

ALEXANDER H. POPKIN.

REFERENCES CITED

The following references are of record in the file of this patent:

UNITED STATES PATENTS

| Number | Name | Date |
| --- | --- | --- |
| 310,128 | Erlenmeyer | Dec. 30, 1884 |
| 1,880,761 | Buchwald | Oct. 4, 1932 |
| 1,891,543 | Huntress | Dec. 20, 1932 |
| 1,948,330 | Calvert | Feb. 20, 1934 |
| 1,954,468 | Booth | Apr. 10, 1934 |
| 1,980,537 | Lange | Nov. 13, 1934 |
| 1,999,395 | Calcott | Apr. 30, 1935 |
| 2,233,129 | Henke | Feb. 25, 1941 |

FOREIGN PATENTS

| Number | Country | Date |
| --- | --- | --- |
| 313,209 | Great Britain | June 10, 1929 |
| 330,229 | Great Britain | June 7, 1930 |

OTHER REFERENCES

Barnett, "Coal Tar Dyes and Intermediates," pp. 120–121 (1919).

Hickinbottom, "Jour. of the Chem. Soc." (London) 1932, pp. 2646 to 2649.

Morton et al., "Jour. of the American Chemical Society," vol. 61, pages 2902 to 2905 (1939).